United States Patent
Kahlert et al.

(10) Patent No.: US 7,465,949 B2
(45) Date of Patent: Dec. 16, 2008

(54) DEVICE FOR READING OUT X-RAY INFORMATION STORED IN A PHOSPHOR LAYER

(75) Inventors: Hans-Juergen Kahlert, Schaftlarn (DE); Werner Nitsche, Unterhaching (DE); Bernd Gerstlauer, Munich (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 152 days.

(21) Appl. No.: 11/299,617

(22) Filed: Dec. 12, 2005

(65) Prior Publication Data
US 2006/0124876 A1 Jun. 15, 2006

(30) Foreign Application Priority Data
Dec. 13, 2004 (EP) ................... 04106500

(51) Int. Cl.
*G01N 23/04* (2006.01)
*G01T 1/105* (2006.01)
(52) U.S. Cl. ...................... 250/586; 250/584
(58) Field of Classification Search .......... 250/584, 250/586
See application file for complete search history.

(56) References Cited

U.S. PATENT DOCUMENTS

| 5,654,556 | A | * | 8/1997 | Yasuda | 250/584 |
| 5,801,391 | A | * | 9/1998 | Arakawa et al. | 250/584 |
| 6,313,477 | B1 | * | 11/2001 | Yasuda et al. | 250/587 |
| 6,377,196 | B1 | * | 4/2002 | Kolsrud et al. | 341/118 |
| 6,628,434 | B1 | * | 9/2003 | Yasuda | 358/496 |
| 2005/0092943 | A1 | | 5/2005 | Nitsche et al. | |
| 2005/0218354 | A1 | | 10/2005 | Nitsche | |
| 2005/0285061 | A1 | | 12/2005 | Gerstlauer et al. | |
| 2005/0285062 | A1 | | 12/2005 | Gerstlauer et al. | |

FOREIGN PATENT DOCUMENTS

| EP | 0138024 | 4/1995 |
| EP | 0966105 | 12/1999 |
| EP | 1111795 | 6/2001 |

* cited by examiner

*Primary Examiner*—David P Porta
*Assistant Examiner*—Carolyn Igyarto
(74) *Attorney, Agent, or Firm*—Houston Eliseeva, LLP

(57) ABSTRACT

A device can read out X-ray information stored in a phosphor layer with an irradiation device for irradiating the phosphor layer with stimulation light which can stimulate the phosphor layer into emitting emission light, and a detector for collecting emission light coming from the phosphor layer and for converting the emission light collected into an analogue detector signal S. In order to increase reliability and resolution when digitising the detector signal, at least two analogue to digital converters are provided which can be operated in different conversion ranges and so can convert the analogue detector signal S into different digital part signal values. Moreover, an analysis device is provided for establishing a digital detector signal value D from the digital part signal values.

15 Claims, 2 Drawing Sheets

DEVICE FOR READING OUT X-RAY INFORMATION STORED IN A PHOSPHOR LAYER

BACKGROUND OF THE INVENTION

The invention relates to a device for reading out X-ray information stored in a storage phosphor layer.

One possibility for recording X-ray pictures is to the X-ray radiation passing through an object, for example a patient, as a latent picture in a so-called storage phosphor layer. In order to read out the latent picture, the storage phosphor layer is irradiated with stimulation light, and so stimulated into emitting emission light. The emission light, the intensity of which corresponds to the picture stored in the storage phosphor layer, is collected by an optical detector and converted into electrical signals. The electrical signals are further processed as required, and finally made available for analysis, in particular for medical/diagnostic purposes when they are displayed on an appropriate display unit, such as e.g. a monitor or a printer.

With generic devices according to the prior art, the detector signals produced by a detector when collecting the emission light are converted by an analogue to digital converter into digital detector signal values. The detector signal values obtained in this way are typically given with a 12 or 14 bit resolution, and this corresponds to a graduation of the detector signal values produced in maximum 4096 or 16384 levels.

So that the respective maximum possible resolution can be achieved when digitising the detector signals, the pre-amplification of the analogue detector signals is set before reading out a storage phosphor layer, dependent upon the height of the detector signals to be expected when reading out this storage phosphor layer. This setting is often undertaken taking into account the so-called Speed Class which is a measure for the X-ray dose stored in the phosphor layer when the X-ray is taken.

Because the aforementioned setting can be undertaken by an operator, operator errors can not be ruled out. If an operator error occurs, the X-ray information stored in the phosphor layer is not read out and digitised which the required resolution. The X-ray must then generally be taken again, and this results in the patient to be examined being subjected to additional radiation.

It is the object of the invention to provide a device for reading out X-ray information stored in a phosphor layer which overcomes the above and other shortcomings in the prior art.

SUMMARY OF THE INVENTION

A device can read out X-ray information stored in a phosphor layer with an irradiation device for irradiating the phosphor layer with stimulation light which can stimulate the phosphor layer into emitting emission light, and a detector for collecting emission light coming from the phosphor layer and for converting the emission light collected into an analogue detector signal S. In order to increase reliability and resolution when digitising the detector signal, at least two analogue to digital converters are provided which can be operated in different conversion ranges and so can convert the analogue detector signal S into different digital part signal values. Moreover, an analysis device is provided for establishing a digital detector signal value D from the digital part signal values. The conversion range of an analogue to digital converter is to be understood here as meaning the respective signal range within which the analogue detector signal can be converted into a corresponding digital detector signal value.

The different conversion ranges of the individual analogue to digital converters can already be set when producing the device by choosing the construction type and/or the sensitivity range and/or the circuit of the individual analogue to digital converters such that for all X-ray pictures to be dealt with different Speed Classes, at least one analogue to digital converter is available in the conversion range of which the analogue detector signal falls.

By means of the invention, manual pre-setting of the intensity of emission light to be expected during a read-out process can be dispensed with, by means of which reliability during read-out and digitisation of the X-ray information is increased. Moreover, in this way a high resolution of the digital detector signal values is guaranteed. Specifically, the device provides detector signals that can be digitised with a greater degree of reliability and the highest possible resolution.

BRIEF DESCRIPTION OF THE DRAWINGS

Further features and advantages of the invention are given in the following description of preferred embodiments and examples of applications, reference being made to the attached drawings.

DETAILED DESCRIPTION OF THE PREFERRED EMBODIMENTS

Figure 1:
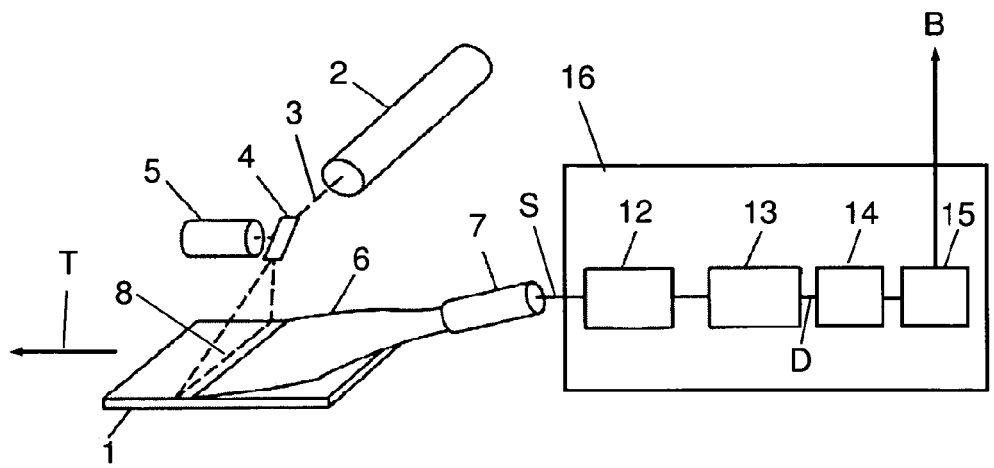
FIG. 1 shows a device for reading out a phosphor layer.

In a preferred embodiment of the invention, at least one adapter is provided for deducing at least two analogue part-signals from the analogue detector signal and for respectively conveying one of the analogue detector signals respectively to one of the analogue to digital converters. The analogue part signals deduced can have different or also the same signal height here. By means of the adapter, the individual analogue to digital converters can be wired differently, by means of which the operation of the analogue to digital converters can be realised easily in different conversion ranges.

In the following, examples are described in greater detail by means of which, individually or in combination, operation of the analogue to digital converters in different conversion ranges can be realised.

With a first example for the realisation of different conversion ranges of the analogue to digital converters, provision is made such that the adapter includes a voltage divider which divides the analogue detector signal into at least two analogue part signals with different signal heights. In the simplest case the voltage divider is realised by means of correspondingly connected ohm resistances, the analogue part signals conveyed to the individual analogue to digital converters being held at different points of the voltage divider.

In a second example of operating the analogue to digital converters in different conversion ranges, provision is made such that the adapter includes one or more amplifiers for the different amplification of the analogue detector signal, at least two analogue part signals being obtained with different signal heights. The differently amplified analogue part signals are conveyed to the individual analogue to digital converters for digitisation. This variation also provides a reliable possibility for realising different conversion ranges for the analogue to digital converters.

With a third example of operating the analogue to digital converters in different conversion ranges, provision is made such that the analogue to digital converters have different sensitivity ranges for the analogue part signals. The sensitivity range of an analogue to digital converter is to be understood here as meaning that signal range within which an analogue part signal given on the analogue to digital converter can be converted into a corresponding digital part signal value.

Different sensitivity ranges can be realised in that analogue to digital converters of different construction type are used which have sensitivity ranges of different sizes. Alternatively or in addition, analogue to digital converters can also be used whereby the sensitivity ranges can be set. This is preferably achieved by setting the amplification of the respective part signals in the respective analogue to digital converters. This is realised for example with analogue to digital converters which have a so-called Programmable Gain Amplifier (PGA).

Alternatively or in addition, the sensitivity ranges of the individual analogue to digital converters can also be set by the choice of reference voltages which are given on the individual analogue to digital converters and represent a reference value for the amplification of the respective analogue part signal.

By means of the latterly mentioned possibilities for choosing different sensitivity ranges, reliable operation of the analogue to digital converters is also easily realised in different conversion ranges.

Particularly advantageous with regard to accuracy and reliability is a combination of an adapter with a voltage divider and the setting of different sensitivity ranges of the respective analogue to digital converters by means of different amplification of the part signals and different reference voltages on the respective analogue to digital converters.

The digital part signal values produced by the different analogue to digital converters are conveyed to an analysis device which is designed to establish a digital detector signal value from the digital test signal values. Preferably the digital detector signal value is established here by selecting one of the digital part signal values.

The analysis device is provided here with an appropriate control logic which selects the digital part signal value which:
A) is the largest compared to the other digital part signal values; and
B) is smaller than a maximum possible digital value for the respective analogue to digital converter.

In this way the digital part signal value is selected for the analogue to digital converter the conversion range of which is optimally used. In particular, digital part signal values are discarded here, i.e. excluded from selection if they fall within the range of the lower limit or above the upper limit of the conversion range of an analogue to digital converter. This can be seen in particular with the control logic in that the digital part signal values produced fall within the range of the smallest possible digital value or with the max. possible digital value, e.g. near to 0 or at 16384 in the case of an analogue to digital converter with a max. resolution of 14 bit.

FIG. 1 shows a device for reading out a phosphor layer 1. By means of a laser 2 a stimulation light beam 3 is produced which is deflected by a deflection element 4 set in rotation by a motor 5 such that said stimulation light beam moves along a line 8 over the phosphor layer 1 to be read out. The deflection element 4 is preferably in the form of a mirror, in particular a polygon mirror or a galvanometer mirror.

Figure 2:
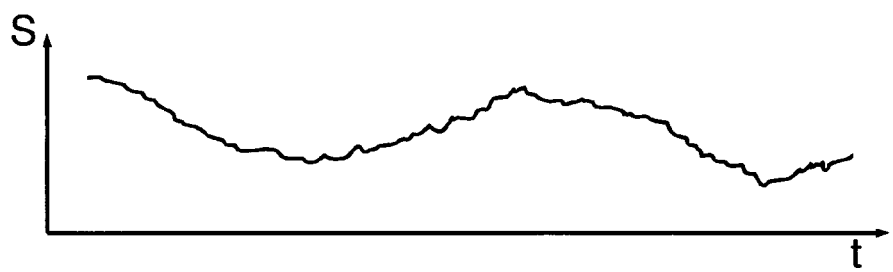
FIG. 2 shows the progress of a detector signal.

During the movement of the stimulation light beam 3 along the line 8, the phosphor layer 1 emits emission light dependent upon the X-ray information stored therein, and this emission light is collected by an optical collection device 6, for example a light conductor bundle, conveyed on and collected by an optical detector 7, preferably a photomultiplier, coupled to the collection device 6, and converted into a corresponding analogue detector signal S. FIG. 2 shows an example of the progress of an analogue detector signal S obtained here over the time t.

The detector signal S is conveyed to a processing device 16 in which picture signal values B are deduced for individual pixels of the X-ray picture read out. By conveying the storage phosphor layer 1 in conveyance direction T, successive readout of individual lines 8 is achieved, and so a two-dimensional X-ray picture having individual pixels each with an associated picture signal value B is obtained. If the number of lines 8 read out in conveyance direction T is for example 1500, with for example 1000 pixels respectively per line 8 for the X-ray picture read out, a total of 1500×1000 pixels each with an associated picture signal value B are obtained.

In the example of an embodiment shown here, the analogue detector signal S is first of all filtered through a low-pass filter 12, higher frequency portions of the detector signal S, in particular noise portions, being eliminated or at least reduced. The filtered, analogue detector signal S is conveyed to a digitisation device 13, and here sampled with a pre-specified sampling frequency and digitised, a digital detector signal value D being obtained in digital units for each sampling process. The sampling frequency is typically between 1 and 12 MHz.

The sampling of the analogue detector signal S in the digitisation device 13 preferably happens according to the so-called Sample and Hold Principle with which the respective current analogue signal height of the detector signal S given at a sampling time on the digitisation unit 13 is held and converted into a corresponding digital detector signal value D.

From the digital detector signal values D temporarily stored in a storage unit 14, the individual picture signal values B are finally established in a calculation unit 15, two or more detector signal values D e.g. being combined into one pixel, and from this—for example by forming an average value—a picture signal value B belonging to this pixel being calculated.

Figure 3:
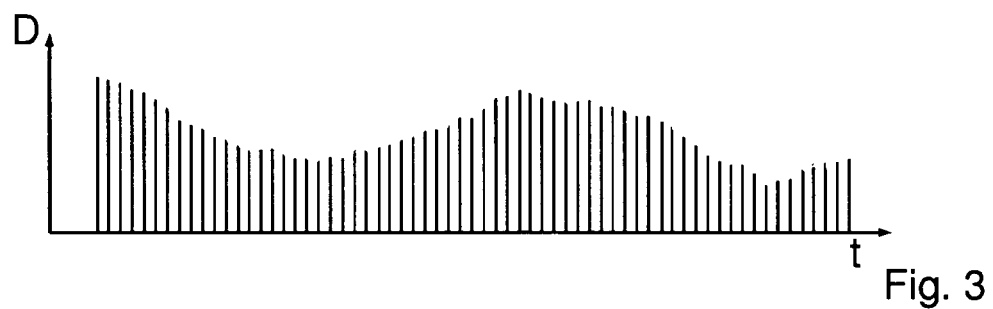
FIG. 3 shows detector signal values deduced from the detector signal.

FIG. 3 shows a large number of digital detector signal values D over the time t which were deduced from the analogue detector signal S shown in FIG. 2. The interval of time between the individual detector signal values D is determined by the pre-specified sampling frequency of the digitisation device 13. To each point in time there corresponds here a specific location of the stimulation light beam 3 on the line 8 of the storage phosphor layer 1. The sampling frequency is preferably chosen here such that for each individual pixel along the line 8, at least two digital detector signal values D are obtained from which a picture signal value B corresponding to a respective pixel can be calculated.

Figure 4:
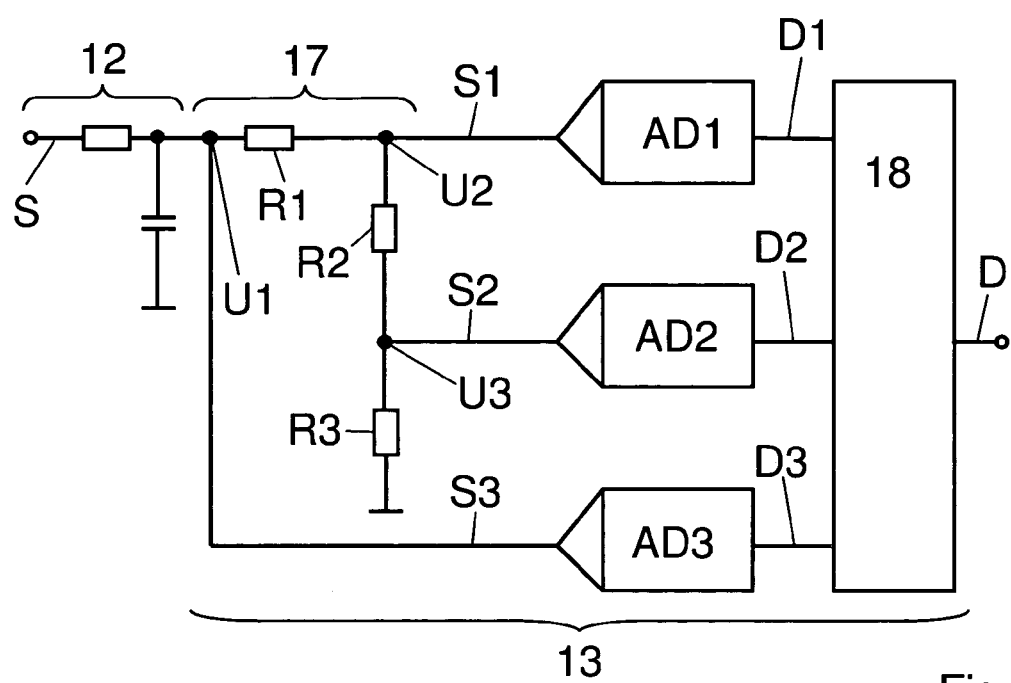
FIG. 4 shows an example of an electric circuit for the conversion according to the invention of the analogue detector signal into digital detector signal values.

FIG. 4 shows an example of an electrical circuit for the deduction, according to the invention, of digital detector signal values D from the analogue detector signal S. The analogue detector signal S given at the input to the electrical circuit is first of all filtered through a low-pass filter 12 which, in the example shown, includes both an ohm resistance and a capacitor, and eliminates higher frequency signal portions, in particular noise portions, from the detector signal S.

The filtered analogue detector signal S is then divided by an adapter 17 into three analogue part signals S1, S2 and S3. In the example shown, the distribution device 17 is in the form of a voltage divider which is made up from three ohm resistances R1, R2 and R3. The analogue part signals S1, S2 and S3 held at different points of the voltage divider generally have different signal heights U1, U2 and U3. The analogue part signals S1, S2 and S3 are respectively conveyed to individual analogue to digital converters AD1, AD2 and AD3, and converted from these into corresponding digital part signal values D1, D2 and D3. In an analysis device 18, a digital detector signal value D is deduced from the digital part signal values D1, D2 and D3, and this preferably happens by selecting a digital part signal value D1, D2 and D3.

The adapter 17, the analogue to digital converters AD1, AD2 and AD3 and the analysis device 18 together form the digitisation device 13 (also see FIG. 1), the functionality of which is described in greater detail in the following using a specific example.

In this example, the three analogue to digital converters AD1, AD2 and AD3 are of the same construction type and each have a 16 bit resolution, i.e. the digital part signal values D1, D2 and D3 produced by the individual analogue to digital converters AD1, AD2 and AD3 can be given with an accuracy of max. 65536 levels or different values, namely from 0 to 65535.

By choosing the resistances R1, R2 and R3 of the voltage divider of the adapter 17 and the sensitivity ranges of the individual analogue to digital converters AD1, AD2 and AD3, different conversion ranges of the individual analogue to digital converters AD1, AD2 and AD3 are realised. In the example presented here, the conversion range of the first analogue to digital converter AD1 is 4 times as large as the conversion range of the second analogue to digital converter AD2, and 16 times as large as the conversion range of the third analogue to digital converter AD3.

With the second and third analogue to digital converters AD2 and AD3, only detector signals S can therefore be digitised which have at the most ¼ or ¹⁄₁₆ of the max. height of the detector signal S convertible by the first analogue to digital converter AD1.

The following numerical example will clarify this: If the max. expected signal height of the analogue detector signal S is 6 V, the electrical circuit is given dimensions and/or the sensitivity ranges are chosen such that the first analogue to digital converter AD1 has a conversion range of between 0 V and 6 V. The conversion ranges of the second and third analogue to digital converters AD2 and AD3 correspondingly lie between 0 V and 1.5 V or between 0 V and 0.375 V.

If an analogue detector signal S with a signal height of 0.2 V is now given at the input to the digitisation unit 13, the digital part signal values D1, D2 and D3 take the values 2185, 8738 and 34952, and so approximately 3%, 13% or 53% of the maximum possible digital value of 65535.

In the succeeding analysis device 18, the digital part signal value is now selected for the analogue to digital converter, the conversion range of which is most heavily used. In the example shown, this is the third digital part signal value D3. This value is finally issued as digital detector signal value D.

On the other hand, the first and second digital part signal value D1 and D2 lie close to the lower limit of the respective conversion range, and are therefore affected by more interference, such as e.g. inherent noise. They are discarded in the analysis device 18.

If an analogue detector signal S with a signal height of 5 V is now given at the input to the digitisation unit 13, only the first analogue to digital converter AD1 supplies a useable digital part signal value D1 with the value 54613, whereas the second and third analogue to digital converters each produce the max. possible digital value 65535. In this case, in the succeeding analysis device 18 the first digital part signal value D1 is selected and multiplied according to a multiplication with the factor 16 which allows for the different sizes of conversion range, and finally issues this as digital detector signal value D.

The same applies for a detector signal value S with a signal height of for example 1.2 V, with which the second digital part signal value D2 of 52428 is selected in the analysis device 18, and after multiplication with the factor 4, is issued as digital detector signal value D.

By means of the circuit described and the operation, according to the invention, of two or more analogue to digital converters, it is also achieved that the overall max. resolution range for the analogue detector signal S extends over the respective max. resolution ranges of the individual analogue to digital converters AD1, AD2 and AD3. In the example shown with three analogue to digital converters with a max. resolution capacity of 16 bit, by means of operation according to the invention, a max. resolution of 20 bit with maximum 1 048 576 levels can be achieved.

By means of this effect, analogue detector signals S can therefore be reliably digitised in a significantly larger dynamic range without having to undertake manual setting of the pre-amplification of the detector signal S taking into account Speed Classes.

In the example described in greater detail above, the digitisation device 13 has three analogue to digital converters. Alternatively, the advantages of the invention are already achieved with two analogue to digital converters which are operated in different conversion ranges. Basically however, the digitisation device 13 can also have more than three analogue to digital converters. The dynamic range can be extended here correspondingly, e.g. to 24 bit or higher.

The invention claimed is:

1. A device for reading out X-ray information stored in a phosphor layer comprising:
    an irradiation device for irradiating the phosphor layer with stimulation light which can stimulate the phosphor layer into emitting emission light;
    a detector for collecting the emission light coming from the storage phosphor layer and for converting the emission light collected into an analogue detector signal;
    at least two analogue to digital converters which are operated in different conversion ranges to convert the analogue detector signal into different digital part signal values;
    an analysis device for establishing a digital detector signal value from the digital part signal values; and
    at least one adapter for generating at least two analogue part signals from the analogue detector signal and for respectively conveying one of the analogue part signals to one of the analogue to digital converters, wherein the adapter comprises a voltage divider which divides the analogue detector signal into the at east two analogue part signals with a different signal height.

2. The device according to claim 1, wherein the adapter comprises one or more amplifiers for the different amplification of the analogue detector signal, the at least two analogue part signals being obtained with a different signal height.

3. The device according to claim 1, wherein the adapter comprises one or more amplifiers for the different amplification of the analogue detector signal, the at least two analogue part signals being obtained with the different signal height.

4. The device according to claim 1, wherein the at least two analogue to digital converters have different sensitivity ranges for the analogue part signals.

5. The device according to claim 4, wherein the sensitivity ranges of the at least two analogue to digital converters is set by setting an amplification programmable gain amplifier of the respective analogue part signal in the at least two analogue to digital converters and/or by choosing a reference voltage of the at least two analogue to digital converters.

6. The device according to claim 1, wherein the analysis device establishes the digital detector signal value by selecting one of the digital part signal values.

7. The device according to claim 6, wherein the analysis device selects the digital part signal value that is larger in comparison to each of the other digital part signal values.

8. The device according to claim 6, wherein the analysis device selects the digital part signal value that is smaller than a maximum possible digital value for the respective analogue to digital converter.

9. The device according to claim 7, wherein the analysis device selects the digital part signal value that is smaller than a maximum possible digital value for the respective analogue to digital converter.

10. A device for reading out X-ray information stored in a phosphor layer comprising:
  an irradiation device for irradiating the phosphor layer with stimulation light which can stimulate the phosphor layer into emitting emission light;
  a detector for collecting the emission light coming from the storage phosphor layer and for converting the emission light collected into an analogue detector signal;
  at least two analogue to digital converters which are operated in different conversion ranges to convert respective analogue part signals into different digital part signal values;
  at least one adapter for generating the analogue part signals having different signal heights from each other from the analogue detector signal using a voltage divider and for conveying the respective analogue part signals to the analogue to digital converters, respectively; and
  an analysis device for establishing a digital detector signal value from the digital part signal values.

11. The device according to claim 10, wherein the analysis device establishes the digital detector signal value by selecting one of the digital part signal values.

12. The device according to claim 11, wherein the analysis device selects the digital part signal value that is larger in comparison to each of the other digital part signal values.

13. The device according to claim 12, wherein the analysis device selects the digital part signal value that is smaller than a maximum possible digital value for the respective analogue to digital converter.

14. The device according to claim 11, wherein the analysis device selects the digital part signal value that is smaller than a maximum possible digital value for the respective analogue to digital converter.

15. A method for reading out X-ray information stored in a phosphor layer comprising:
  irradiating the phosphor layer with stimulation light which can stimulate the phosphor layer into emitting emission light;
  collecting the emission light coming from the storage phosphor layer;
  converting the emission light collected into an analogue detector signal;
  converting the analogue part signals into different digital part signal values using at least two analogue to digital converters that are operated in different conversion ranges;
  generating the analogue part signals having different signal heights from each other from the analogue detector signal using a voltage divider;
  conveying the respective analogue part signals to the analogue to digital converters, respectively; and
  establishing a digital detector signal value from the digital part signal values.

* * * * *